Aug. 16, 1932.  R. N. VAN BUSKIRK  1,872,197
BRAKE
Original Filed March 31, 1928
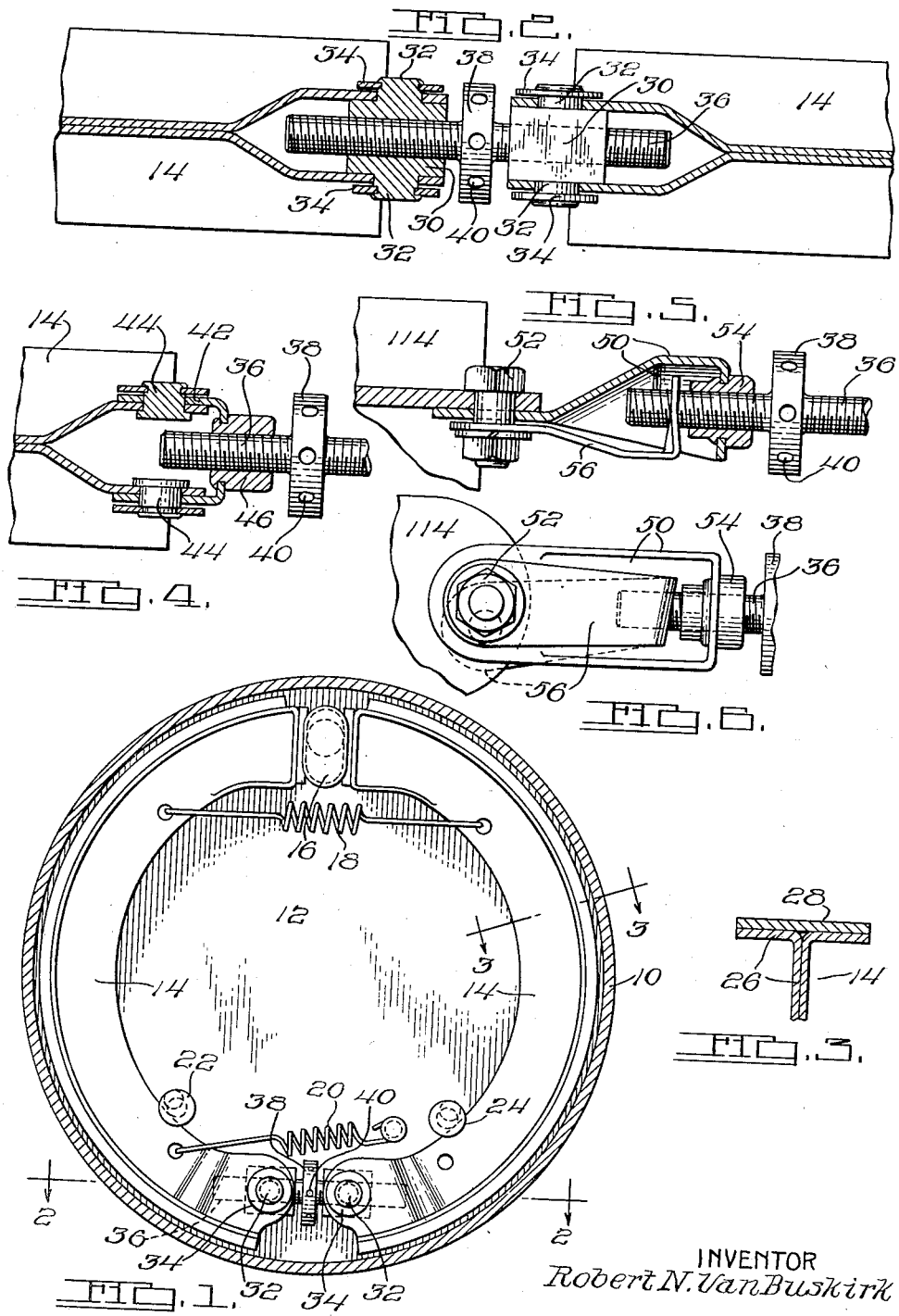
INVENTOR
Robert N. Van Buskirk
BY
ATTORNEY Patented Aug. 16, 1932

1,872,197

UNITED STATES PATENT OFFICE

ROBERT N. VAN BUSKIRK, OF DETROIT, MICHIGAN, ASSIGNOR TO BENDIX BRAKE COMPANY, OF SOUTH BEND, INDIANA, A CORPORATION OF ILLINOIS

BRAKE

Application filed March 31, 1928, Serial No. 266,130. Renewed August 7, 1931.

This invention relates to brakes, and is illustrated as embodied in an internal expanding automobile brake. An object of the invention is to provide a simple adjustment for the friction means of the brake, preferably forming part of a novel floating pivot or joint connecting adjacent ends of the brake shoes. Various features of novelty relate to the pivotal mounting on the shoe end of a stamping or the like forming part of the joint, to the arrangement of the pivotally-mounted parts, to the formation of the shoe to receive the parts of the joint, and to the locking of the adjustment when made.

The above and other objects and features of the invention, including various desirable details of construction, will be apparent from the following description of the illustrative embodiments shown in the accompanying drawing, in which:

Figure 1 is a vertical section through the brake, just inside the head of the brake drum, and showing the brake shoes in side elevation;

Figure 2 is a partial section through the novel joint, substantially on the line 2—2 of Figure 1;

Figure 3 is a section through one of the brake shoes, on the line 3—3 of Figure 1;

Figure 4 is a view corresponding to part of Figure 2, but showing a modification;

Figure 5 is a similar view showing another modification; and

Figure 6 is a side elevation of the parts shown in Figure 5.

The brake, as illustrated in Figure 1, includes a rotatable drum 10, at the open side of which is a support such as a backing plate 12, and within which is the friction means of the brake. The friction means may include interchangeable shoes 14 pivotally connected by a novel adjustable floating joint, and applied by means such as a double cam 16 against the resistance of a return spring 18. An auxiliary spring 20 acts when the brake is released to hold one of the shoes against an adjustable eccentric stop 22. A similar stop 24 may be provided for the other shoe if desired. The torque of the brake is taken by cam 16 or its equivalent.

The shoes 14 of Figures 1–4 consist of two L-section stampings 26 welded or riveted back to back and forming a steel body structure to which the friction lining 28 is welded or otherwise secured. In Figures 5 and 6 the shoe 114 is formed by welding a central web directly to the inner face of an outer rim carrying the friction lining.

In Figures 1 and 2, the stampings forming the shoes are spread apart at the ends of the shoes to form recesses for die-cast members 30 formed with trunnions 32 seated in openings in the stampings, and shown as riveted over on washers 34, thus pivotally mounting the members 30 in the shoe ends. A right-and-left threaded member 36, formed with a central collar 38 having recesses 40 to receive a nail or other tool for manipulating it in making an adjustment, is threaded into members 30, which thus in effect form nuts for a screw-and-nut adjustment. Backing plate 12 may be formed with a suitable covered opening affording access to the adjustment.

In Figure 4, a U-shaped stamping 42 has its sides pivotally connected to the spread-apart stampings forming the shoe, by pivots 44, and has a portion extending crosswise of the shoe end and carrying a threaded nut 46 receiving the adjusting member 36. Nut 46 is shown with an integral extension riveted over on the stamping 42 to secure the nut permanently.

In Figures 5 and 6, a channel-section steel stamping 50 is connected to the shoe end by a pivot bolt 52, and has a portion extending crosswise of the shoe end and carrying a nut 54 receiving the adjusting member 36. A locking member 56, shown as a steel stamping, has a portion sleeved on the end of member 36. When dropped down to dotted-line position, Figure 6, member 56 does not in any way interfere with turning member 36 to make the adjustment. When lifted up to full-line position, in which an opening in the left end of the stamping can be slipped over and held by bolt 52, however, the right end of the stamping binds on member 36 and effectively locks it against turning.

While several illustrative embodiments have been described in detail, it is not my intention to limit the scope of the invention to those particular embodiments, or otherwise than by the terms of the appended claims.

I claim:

1. A brake comprising a pair of shoes having a floating joint consisting of members pivotally mounted at adjacent ends of the shoes and a right-and-left threaded adjustable connecting member threaded into the pivotally-mounted members, the shoes having at least at their ends webs consisting of two parts which are spread apart to form spaced supports for the pivotally-mounted members.

2. A brake comprising, in combination, a pair of shoes arranged end to end, a stamping pivotally secured to the end of each shoe and having a portion extending across the shoe end, a nut secured to said portion of each stamping, and a connecting member adjustably threaded into both nuts.

3. A brake comprising, in combination, a pair of shoes arranged end to end, a member pivotally secured to the end of each shoe and having a portion extending across the shoe end, a nut secured to said portion of each member, and a connecting member adjustably threaded into both nuts.

4. A brake comprising, in combination, a pair of shoes arranged end to end and having U-shaped stampings with the sides of each stamping pivotally secured to the end of the corresponding shoe and with the central portion of each stamping extending crosswise of the shoe end, and connecting means adjustably secured to the central portions of the stampings.

5. A brake comprising, in combination, a pair of shoes arranged end to end and having U-shaped members with the sides of each member pivotally secured to the end of the corresponding shoe and with the central portion of each member extending crosswise of the shoe end, and connecting means adjustably secured to the central portions of the two members.

6. A brake shoe having a member pivotally secured to its end and formed with a portion extending crosswise of the shoe end, together with a threaded nut secured to said portion of the pivotally-mounted member.

7. A brake comprising a pair of shoes having a floating joint consisting of members pivotally mounted at adjacent ends of the shoes and a right-and-left threaded adjustable connecting member threaded into the pivotally-mounted members, the shoes having at least at their ends webs consisting of two parts which are spread apart to form spaced supports between which the pivotally-mounted members are arranged.

8. A brake shoe having a member pivotally secured to its end and formed with a portion extending crosswise of the shoe end, together with a threaded nut secured to said portion of the pivotally-mounted member, in combination with a locking device mounted on said shoe end, and in alignment with the threaded bore of said nut.

9. A brake shoe having a web at least at its end, a member provided with a threaded nut adjacent said end, a pivot bolt securing the web and said member pivotally together, an adjusting member threaded into said nut, and a locking device held by said bolt and preventing the adjusting member from turning.

10. A brake shoe having at its end a member provided with a threaded nut, an adjusting member threaded into said nut, and a locking device mounted on the shoe and preventing the adjusting member from turning.

11. A brake shoe having a member pivotally secured to its end and formed with a portion extending crosswise of the shoe end, together with a threaded nut secured to said portion of the pivotally-mounted member, and a locking device adapted to lock an adjusting screw threaded in said nut.

12. A brake comprising a pair of shoes having a floating joint said joint comprising members pivotally mounted at adjacent ends of the shoes, and a differentially threaded adjustable connecting member threaded into the pivotally mounted members, the shoes having at their ends spaced apart webs forming supports for said pivotal members.

13. A brake shoe having spaced webs at one end thereof, a threaded nut having extensions pivotally secured to said webs, and an adjustment screw threaded in said nut.

In testimony whereof, I have hereunto signed my name.

ROBERT N. VAN BUSKIRK.